United States Patent
Buchanan et al.

(10) Patent No.: US 7,310,782 B2
(45) Date of Patent: Dec. 18, 2007

(54) METHOD AND APPARATUS FOR ARRANGING PROGRAM AND I/O CONTROLS

(75) Inventors: Robert Alan Buchanan, Dousman, WI (US); John D. Hoford, Pewaukee, WI (US); Pawan P. Singh, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 230 days.

(21) Appl. No.: 11/217,210

(22) Filed: Sep. 1, 2005

(65) Prior Publication Data

US 2007/0050057 A1    Mar. 1, 2007

(51) Int. Cl.
*G06F 3/048* (2006.01)
*G05B 11/01* (2006.01)
(52) U.S. Cl. .............. 715/815; 715/765; 715/767; 715/825; 715/826; 715/843; 700/17
(58) Field of Classification Search ............. 715/734, 715/736, 738, 764, 765, 767, 833, 841, 862, 715/815, 825, 826, 843; 700/17, 83; 345/156, 345/157, 440
See application file for complete search history.

(56) References Cited

U.S. PATENT DOCUMENTS

| | | | | |
|---|---|---|---|---|
| 5,623,613 | A * | 4/1997 | Rowe et al. ............... | 715/841 |
| 5,664,132 | A * | 9/1997 | Smith ..................... | 715/834 |
| 5,673,401 | A * | 9/1997 | Volk et al. ............... | 725/139 |
| 6,246,408 | B1 * | 6/2001 | Alexander ............... | 345/440.1 |
| 6,505,209 | B1 * | 1/2003 | Gould et al. ............. | 707/102 |
| 6,546,368 | B1 * | 4/2003 | Weninger et al. ......... | 704/270 |
| 7,266,768 | B2 * | 9/2007 | Ferlitsch et al. ......... | 715/526 |
| 2003/0202008 | A1 * | 10/2003 | McDonald et al. ....... | 345/736 |
| 2004/0076444 | A1 * | 4/2004 | Badovinac et al. ....... | 399/81 |
| 2005/0021190 | A1 * | 1/2005 | Worrell et al. ........... | 701/1 |
| 2006/0055670 | A1 * | 3/2006 | Castrucci ................. | 345/157 |
| 2006/0256073 | A1 * | 11/2006 | Satanek ................... | 345/156 |

* cited by examiner

*Primary Examiner*—Crystal J. Barnes

(57) ABSTRACT

A computer system includes a display and a processor. The processor operable to implement a user interface on the display. The user interface including a plurality of program controls for initiating processing tasks. The processor is operable to, responsive to an activation of a selected program control, place an I/O control associated with the selected program control proximate the selected program control to allow visual association between the I/O control and the selected program control.

16 Claims, 7 Drawing Sheets

METHOD AND APPARATUS FOR ARRANGING PROGRAM AND I/O CONTROLS

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The field of the invention relates generally to a user interface, and more particularly to a method and apparatus for displaying program and I/O controls.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Graphical user interfaces proliferate in modern computer and data processing systems. One such system is a medical imaging system, such as an x-ray system, computed tomography (CT) system, positron emission tomography (PET) system, electron beam tomography (EBT) system, magnetic resonance imaging (MRI) system, ultrasound system, tomosynthesis system, and so forth. A typical user interface for a medical imaging system includes a data window and a plurality of program controls for performing various functions associated with manipulating the data and controlling various aspects of the imaging machine used to collect the data. For example, the medical imaging systems may produce detailed images of a patient's internal tissues and organs, thereby mitigating the need for invasive exploratory procedures and providing valuable tools for identifying and diagnosing disease or for verifying wellness.

A commonly occurring pattern in graphical user interfaces is the activation of a program control, such as a command button, which upon activation, starts a processing activity that requires further input from the user or provides output data (e.g., completion status) to the user. Typically, subsequent I/O exchanges are handled using pop-up dialog windows containing the display and input components with which the user must interact to complete the activity.

There are several disadvantages to this pattern. First, the dialog windows have no obvious relationship with the button that created them. Multiple processing activities may be progressing at a given time. The lack of connection between the command button and the dialog window increases confusion. Second, the dialog windows at least partially obscure other program controls or data present on the screen. The obscured information may be useful for monitoring one or more processes and may actually be useful for entering the data required in the dialog window itself. If other windows can be raised over the dialog window, they may not be returned to the forefront when needed. Hence, the user may not even realize that additional information is required to complete the processing task initiated by the command button.

If two or more dialog driven activities are in progress simultaneously, the dialog windows complete not only with the underlying screen information, but with each other as well. The user must manually rearrange the dialog windows to reveal the necessary information or to access information on other processes. Since the pattern relies on the ability of the user to move the dialogs, the potential exists that information may be obscured that should not be obscured during the operation of the system (e.g., for equipment or safety reasons). Important status information may be obscured by one of the dialog windows.

The present invention is directed to overcoming, or at least reducing the effects of, one or more of the problems set forth above.

BRIEF SUMMARY OF THE INVENTION

One aspect of the present invention is seen in a computer system including a display and a processor. The processor operable to implement a user interface on the display. The user interface including a plurality of program controls for initiating processing tasks. The processor is operable to, responsive to an activation of a selected program control, place an I/O control associated with the selected program control proximate the selected program control to allow visual association between the I/O control and the selected program control.

Another aspect of the present invention is seen in a method for controlling a user interface. The method includes providing a plurality of program controls. Each program control is operable to initiate a processing task. Responsive to an activation of a selected program control, an I/O control associated with the selected program control is placed proximate the selected program control to allow visual association between the I/O control and the selected program control.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
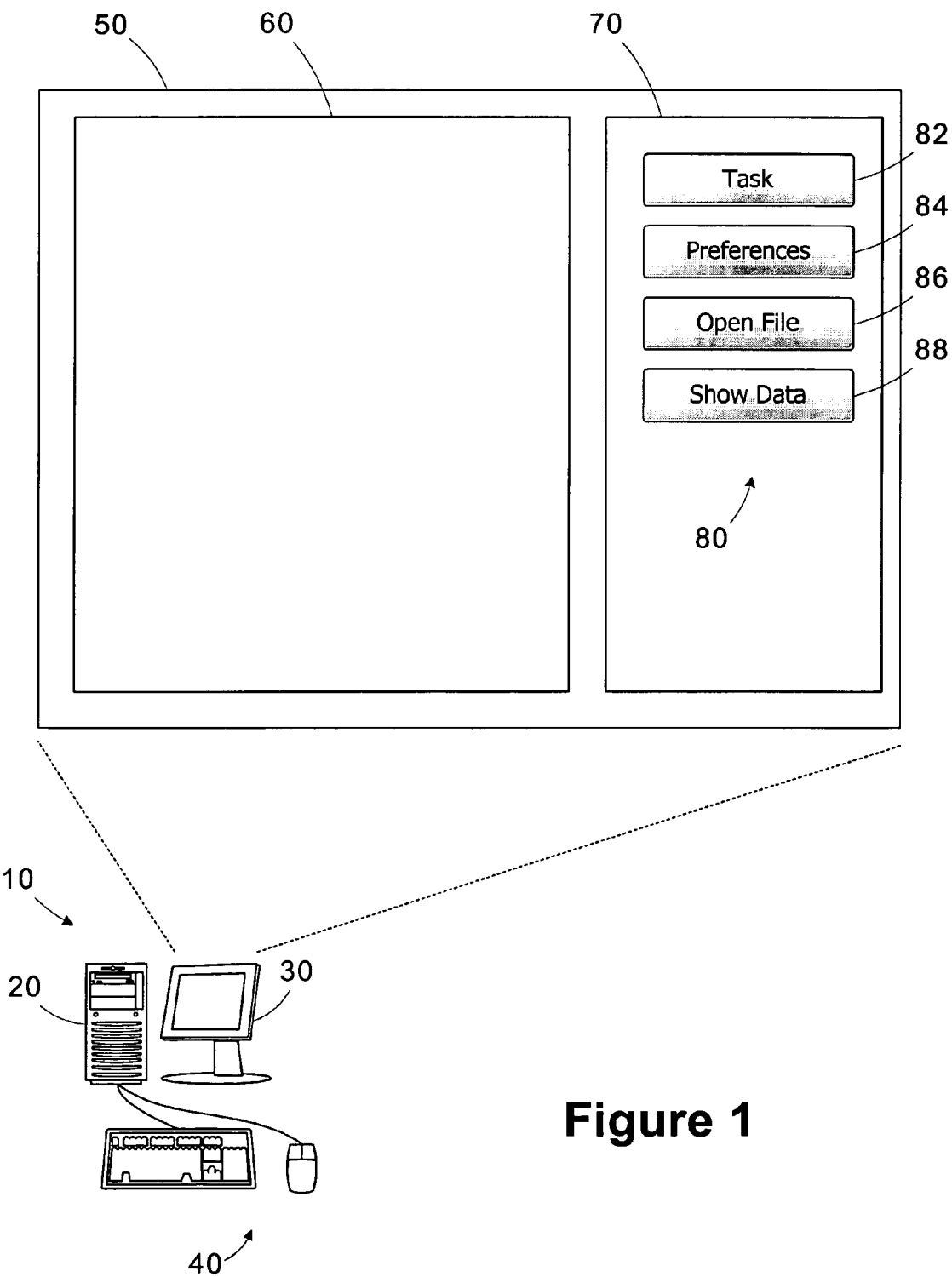
FIG. 1 is a simplified diagram of a computer system implementing a graphical user interface in accordance with the present invention.

Turning now to the drawings, referring initially to FIG. 1, an exemplary computer system 10 including a processing unit 20, a display 30, and an interface device 40 is depicted. The computer system 10 implements a graphical user interface 50 for interacting with a user. The graphical user interface 50 includes a data panel 60 and a control panel 70. The data panel 60 may display data associated with a current process, such as a medical image. The control panel 70 includes one or more program controls 80 for executing underlying processing tasks, such as for performing an operation associated with data displayed in the data panel 60 or acquiring data for display in the data panel 60 (e.g., initiating a medical imaging scan process). The particular arrangement of the graphical user interface 50 may vary depending on the particular implementation. For example, the data panel 60 may not be present in some embodiments. Also, the program controls 80 may not be grouped within a control panel 70, but rather may be distributed about the graphical user interface 50.

A user may activate one of the program controls 80 using the interface device 40 (e.g., mouse, keyboard, stylus, etc.). At some point during the processing triggered by the activation of a particular program control 80, I/O data associated with the process may need to be exchanged with the user. For example, the progress of the processing task or data associated with the task may be displayed. Alternatively, the user may be queried for additional information needed for the processing task to complete. In general, the processing unit 20 controls the graphical user interface 50 such that I/O data associated with a processing task is presented in a location proximate the program control 80 that initiated the task. Also, the I/O data is presented in a manner that does not obscure other program controls 80 or the data panel 60.

Program controls 80 are considered controls that initiate an underlying processing task, as opposed to other types of controls such as scrollbar controls or dropdown control whose sole purpose is related to the manually sizing or placement of items on the graphical user interface 50. For example, in the Windows® XP operating system offered by Microsoft Corporation, controls are provided for expanding or collapsing defined frames or to scroll windows. The sole purpose of these sizing controls is to manually manipulate the graphical user interface 50 and not to perform an underlying processing task.

Turning now to FIGS. 2-5, the placement of I/O data associated with the initiating program control 80 is described in more detail. For purposes of the following illustration, exemplary program controls 80 are provided, such as a task control 82, a preferences control 84, an open file control 86, and a show data control 88. These particular control types are merely illustrative, and the application of the present invention is not limited to any particular program control type or purpose.

Upon activation of a program control 80 a related I/O control is placed proximate the initiating program control 80, and the remaining program controls 80 are rearranged to make room for the I/O control, such that the I/O control does not obscure the other program controls 80 or the data panel 60. The specific I/O controls may vary depending on the particular implementation and the specific processing tasks associated with the program controls 80. In general, an I/O control is defined as an element on the graphical user interface 50 that requests data associated with the initiating program control 80 (i.e., input control) or displays data associated with the initiating program control 80 (i.e., output control).

Figure 2:
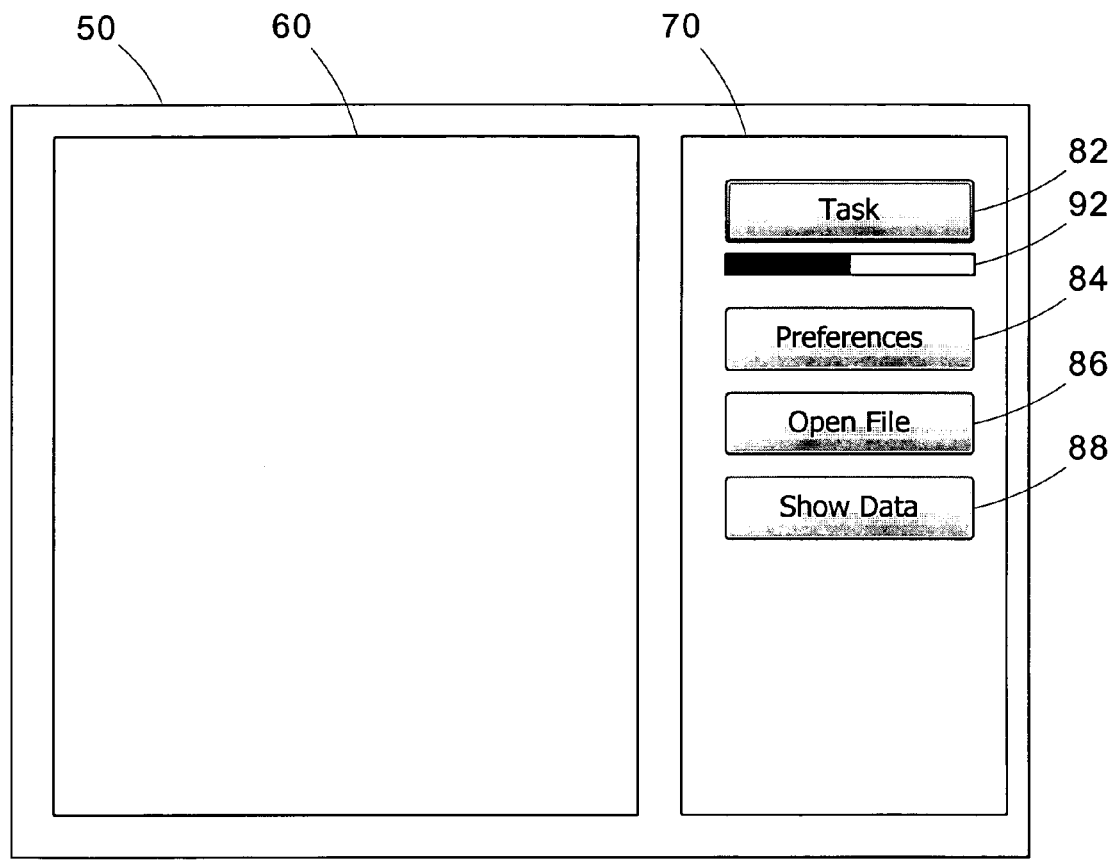
FIGS. 2-7 are diagrams of the graphical user interface of FIG. 1 illustrating the placement of I/O controls with respect to associated program controls.

As seen in FIG. 2, following the activation of the task control 82, a completion status control 92 (i.e., an I/O control) is placed proximate the task control 82. The completion status control 92 is a bar that is shaded as the processing task completes. Upon initiation of the task control 82, the completion status control 92 is completely unshaded. When the task is complete, the completion status control 92 is completely shaded. As illustrated in FIG. 2, the completion status control 92 corresponds to a completion status of approximately 50%. The completion status control 92 is placed proximate the task control 82 to make clear that the I/O data it displays is associated with the task control 82. In the illustrated embodiment, the completion status control 92 is placed immediately below the 82. Of course, other placements may be used. The other controls 84, 86, 88 are moved so that the completion status control 92 does not obscure them. In the illustrated embodiment, the other controls 84, 86, 88 are moved downward within the control panel 70 to make room for the completion status control 92. Various layout algorithms may be used for reorganizing the program controls 80 depending on the particular layout of the graphical user interface 50 (e.g., the size and placement of the data panel 60 and/or control panel 70.

After completion of the processing task, the completion status control 92 is removed, and the graphical user interface 50 returns to the configuration shown in FIG. 1, assuming no other program controls 80 have been activated during the processing associated with the task control 82.

Figure 3:
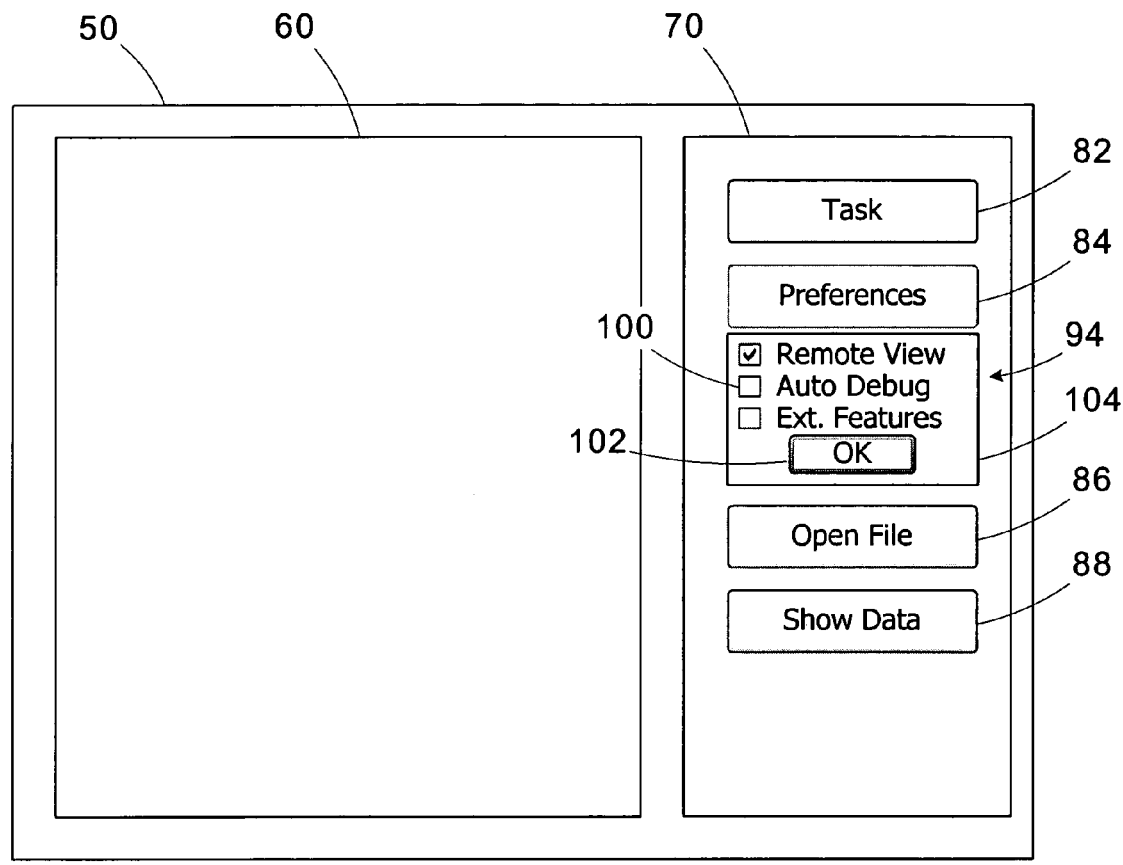

Turning to FIG. 3, following the activation of the preferences control 84, a I/O control defined by a preferences panel 94 is displayed proximate the preferences control 84. The preferences panel 94 includes preference check boxes 100 and an OK button 102 The remaining controls 82, 86, 88 are rearranged to allow the preferences panel 94 to be displayed without obscuring other information on the graphical user interface 50. The association of the preferences panel 94 with the preferences control 84 is enhanced by the presence of a border 104 surrounding the preference check boxes 100 and the OK button 102. Alternatively, the border 104 may be extended to encompass the preferences control 84 itself, further delineating the association. Upon activation of the OK button 102 to signify acceptance of the preference selections, the preferences panel 94 may be removed and the program controls 80 may be rearranged (e.g., to their default state, if desired).

Figure 4:
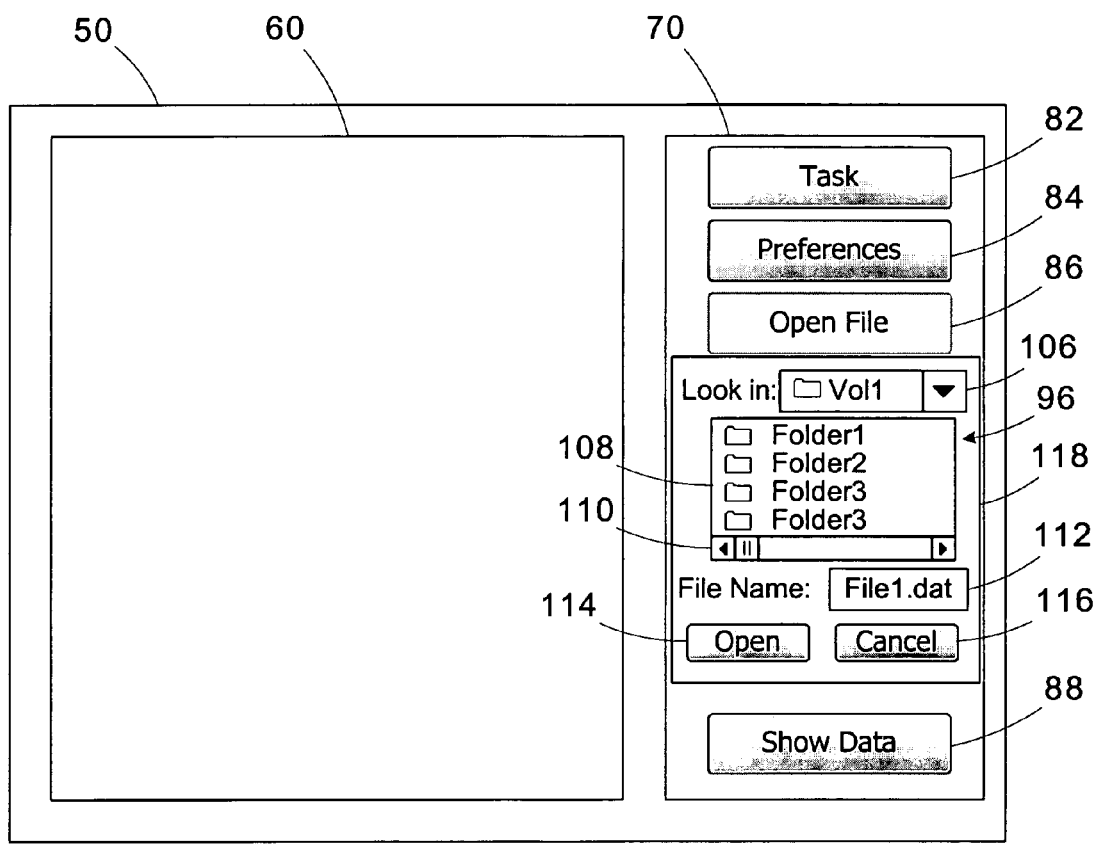

Referring to FIG. 4, a file tree control 96 is displayed responsive to the activation of the open file control 86. For example, the open file control 86 may be activated to open an existing medical imaging data file for display within the data panel 60. The file tree control 96 includes a tree field 106 for selecting the top level of the file tree in which to search for a file, a file panel 108 for showing the contents of the folder designated in the tree field 106, a scroll bar 110 for moving the focus of the file panel 108, a name field 112 for indicating the name of the file selected in the file panel 108, an open button 114 for indicating that the selected file should be opened, and a cancel button 116 for indicating that the file open process initiated by the open file control 86 should be cancelled. Again, a border 118 is used to enhance the association between the open file control 86 and the file tree control 96.

Figure 5:
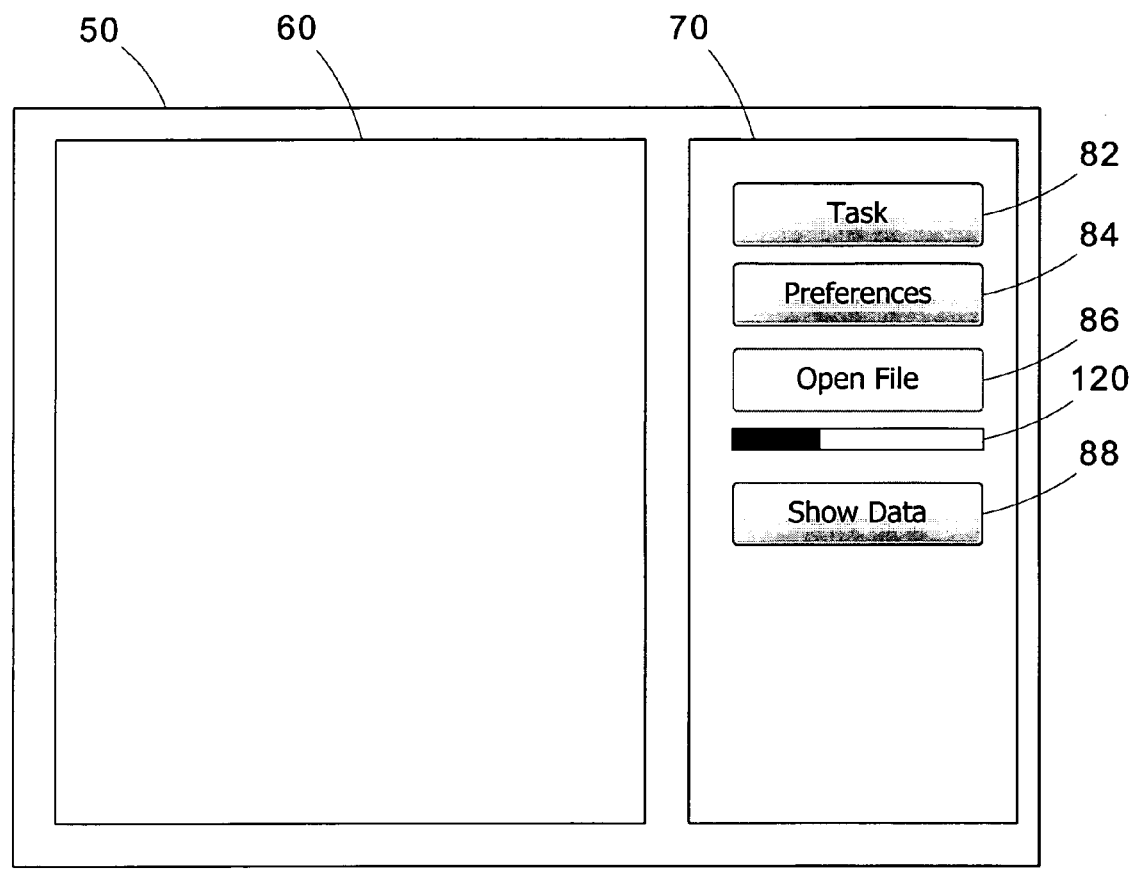

If the cancel button 116 is selected, the preferences panel 94 may be collapsed and the program controls 80 may be rearranged. If the open button 114 is selected, the file may be opened and displayed in the data panel 60. If the process for opening and processing the file takes an appreciable amount of time, the file tree control 96 may be removed and replaced with a completion status control 120 as shown in FIG. 5 while the data is appropriated and processed for display in the data panel 60. After the file opening process is complete, the completion status control 120 may be removed and the program controls 80 rearranged to their default states.

Figure 6:
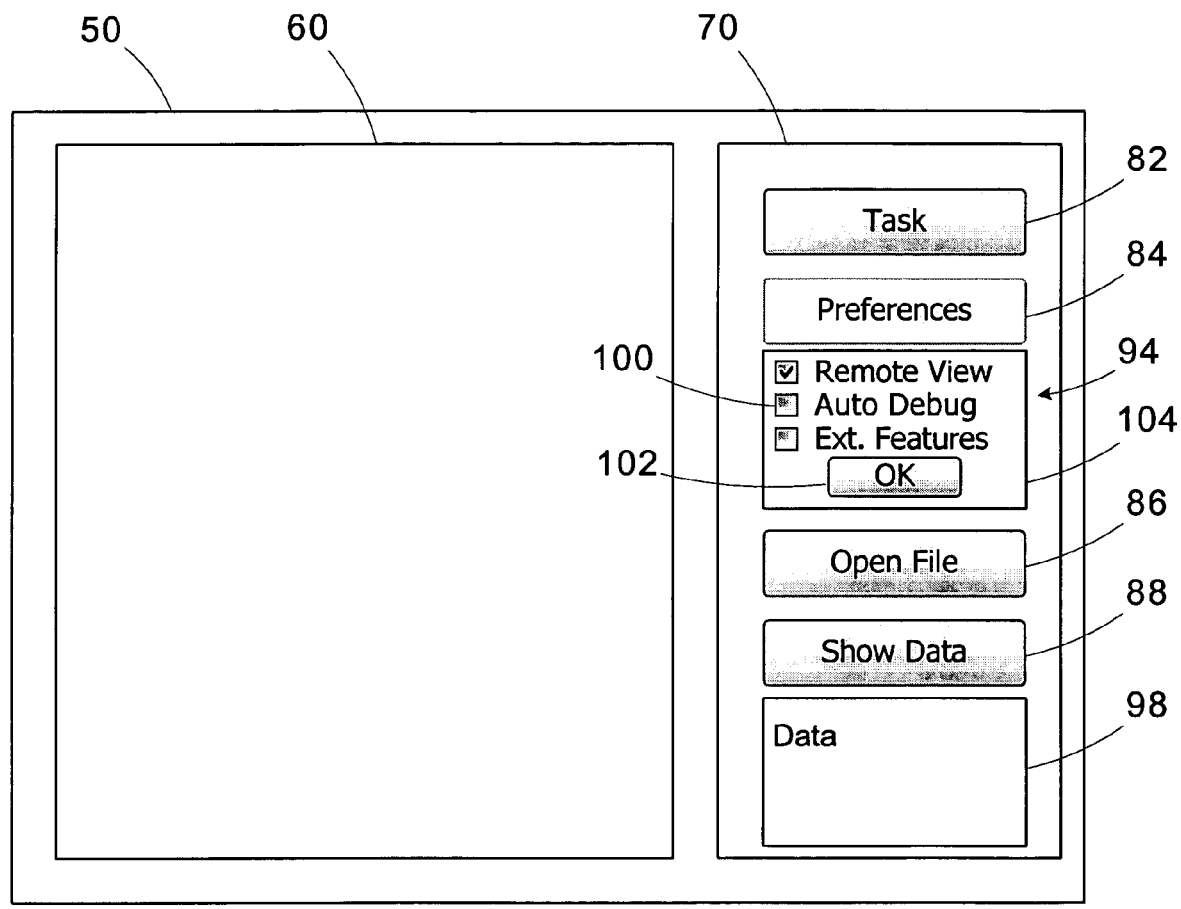

Referring now to FIG. 6, a data field 98 is displayed responsive to the activation of the show data control 88. Data associated with the show data control 88 is displayed within the data field 98. For example, some data associated with an image displayed in the data panel 60 may be annotated over the image and displayed concurrently. Other data, may not be normally displayed as an overlay in the data panel 60, but may be instead retrieved using the show data control 88 and displayed in the data field 98. The data field 98 is displayed proximate the initiating show data control 88 without obscuring the other program controls 80, their associated I/O data, or the data panel 60.

In the example of FIG. 6, the preferences control 84 is still active at the time the show data control 88 is activated. To accommodate both program controls 84, 88 being active at the same time, the preferences panel 94 is placed proximate the preferences control 84, the data field 98 is placed proximate the show data control 88, and the remaining program controls 82, 86 are rearranged to make room for the simultaneously displayed I/O controls 94, 98.

Figure 7:
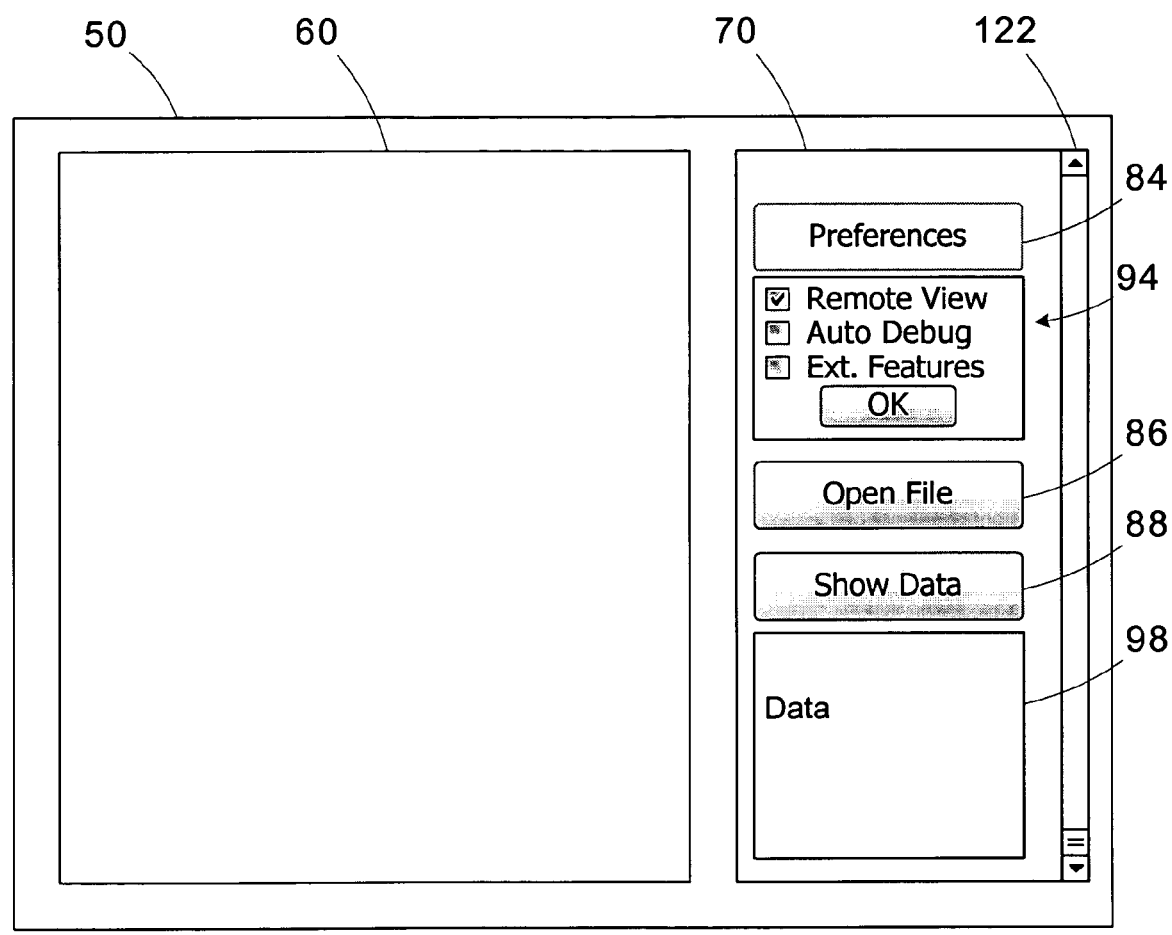

In some cases, it may not be possible to simultaneously display all of the program controls 80 and their associated I/O controls within the control panel 70 due to the size of the I/O controls or the size of the display 30 used to show the graphical user interface 50. In such cases, as shown in FIG. 7, a scroll bar 122 may be added to the control panel 70 to allow its contents to be scrolled to change which program controls 80 and I/O controls are visible. For example, in the illustration provided in FIG. 7, the task control 82 is not visible. The order of the program controls 80 may be varied depending on the relative importance of the program control 80. For example, those program controls 80 having a high importance may be grouped and arranged in the center of the scroll window defined by the scroll bar 122, and the less important program controls 80 may be placed on the upper and/or lower bounds of the scroll window.

The graphical user interface 50 of the present invention has numerous advantages. First, I/O controls are placed proximate the initiating program controls to reduce confusion regarding the source of an I/O information request of data display. Unlike previous dialog box techniques, the I/O controls may be visually associated with the activity and do not obscure other program controls or data. The placement of the various controls is under the control of the application program's own layout algorithms, as opposed to default layout conventions (e.g., a pop-up dialog appears centered on the screen regardless of what it obscures) or unconstrained user action (e.g., manual relocation). Hence, the application may more readily enforce safety, legal, or usability constraints regarding the obscuring of underlying information. The graphical user interface 50 of the present invention also allows for the activation of multiple, simultaneous program controls without having competing I/O controls overlaying each other in an uncontrolled way. This improved pattern for simultaneous activity also reduces the need for modal dialogs that block all other activity until disposed of.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for controlling a user interface, comprising:
providing a plurality of program controls, each program control being operable to initiate a processing task;
responsive to an activation of a selected program control, placing an I/O control associated with the selected program control proximate the selected program control to allow visual association between the I/O control and the selected program control; and
moving at least one of the program controls to allow the placement of the I/O control proximate the selected program control.

2. The method of claim 1, wherein placing the I/O control further comprises placing the I/O control proximate the selected program control without obscuring at least those program controls adjacent the selected program control.

3. The method of claim 1, wherein placing the I/O control further comprises placing the I/O control below the selected program control.

4. The method of claim 1, further comprising:
providing a control panel;
placing the program controls within the control panel: and
moving the at least one program control within the control panel to allow the placement of the I/O control proximate the selected program control.

5. A computer system, comprising:
a display; and
a processor operable to implement a user interface on the display, the user interface including a plurality of program controls for initiating processing tasks, wherein the processor is further operable to, responsive to an activation of a selected program control, place an I/O control associated with the selected program control proximate the selected program control to allow visual association between the I/O control and the selected program control, and wherein the processor is operable to provide a border around the selected program control and the I/O control.

6. A method for controlling a user interface, comprising:
providing a plurality of program controls, each program control being operable to initiate a processing task;
responsive to an activation of a selected program control, placing an I/O control associated with the selected program control proximate the selected program control to allow visual association between the I/O control and the selected program control; and
providing a border around the selected program control and the I/O control.

7. The method of claim 1, wherein the I/O control comprises at least one of an input control operable to request information from a user related to the processing task associated with the selected program control and an output control operable to display information to a user related to the processing task associated with the selected program control.

8. A computer system, comprising:
 a display; and
 a processor operable to implement a user interface on the display, the user interface including a plurality of program controls for initiating processing tasks, wherein the processor is further operable to, responsive to an activation of a selected program control, place an I/O control associated with the selected program control proximate the selected program control to allow visual association between the I/O control and the selected program control, and wherein the processor is operable to move at least one of the program controls to allow the placement of the I/O control proximate the selected program control.

9. The system of claim 8, wherein the processor is operable to place the I/O control proximate the selected program control without obscuring at least those program controls adjacent the selected program control.

10. The system of claim 8, wherein the I/O control comprises at least one of an input control operable to request informnation from a user related to the processing task associated with the selected program control and an output control operable to display information to a user related to the processing task associated with the selected program control.

11. The system of claim 8, wherein the user interface includes a control panel, the program controls are disposed within the control panel, and the processor is operable to move at least one program control within the control panel to allow the placement of the I/O control proximate the selected program control.

12. The system of claim 8, wherein the processor is operable to place the I/O control below the selected program control.

13. A medical imaging system, comprising:
 a display; and
 a processor operable to implement a user interface on the display, the user interface including:
  a data panel operable to display medical imaging data;
  a control panel: and
  a plurality of program controls disposed within the control panel for initiating processing tasks associated with the medical imaging data,
 wherein the processor is further operable to, responsive to an activation of a selected program control, place an I/O control associated with the selected program control proximate the selected program control to allow visual association between the I/O control and the selected program control, and wherein the processor is operable to move at least one of the program controls within the control panel to allow the placement of the I/O control proximate the selected program control.

14. The system of claim 13, wherein the I/O control comprises at least one of an input control operable to request infonnation from a user related to the processing task associated with the selected program control and an output control operable to display information to a user related to the processing task associated with the selected program control.

15. The system of claim 13, wherein the processor is operable to place the I/O control proximate the selected program control without obscuring the data panel.

16. The system of claim 13, wherein the processor is operable to place the I/O control proximate the selected program control without obscuring at least those program controls adjacent the selected program control.

* * * * *